(12) United States Patent
Pruitt et al.

(10) Patent No.: US 10,801,296 B1
(45) Date of Patent: *Oct. 13, 2020

(54) TALL FLANGE RUBBER ADAPTER

(71) Applicants: Grant Pruitt, Fort Smith, AR (US); Cris Braun, Van Buren, AR (US)

(72) Inventors: Grant Pruitt, Fort Smith, AR (US); Cris Braun, Van Buren, AR (US)

(73) Assignee: PRUITT TOOL & SUPPLY CO., Fort Smith, AR (US)

( * ) Notice: Subject to any disclaimer, the term of this patent is extended or adjusted under 35 U.S.C. 154(b) by 53 days.

This patent is subject to a terminal disclaimer.

(21) Appl. No.: 16/056,145

(22) Filed: Aug. 6, 2018

Related U.S. Application Data

(63) Continuation-in-part of application No. 15/064,313, filed on Mar. 8, 2016, now Pat. No. 10,041,324.

(51) Int. Cl.
*E21B 3/04* (2006.01)
*E21B 33/08* (2006.01)
*F16B 7/20* (2006.01)

(52) U.S. Cl.
CPC ............... *E21B 33/085* (2013.01); *E21B 3/04* (2013.01); *E21B 33/08* (2013.01); *F16B 7/20* (2013.01)

(58) Field of Classification Search
CPC ........ E21B 3/04; E21B 33/03; E21B 33/0415; E21B 33/068; E21B 33/08; E21B 33/085
See application file for complete search history.

(56) References Cited

U.S. PATENT DOCUMENTS

| | | | |
|---|---|---|---|
| 4,312,404 A * | 1/1982 | Morrow ................ | E21B 33/085 166/84.3 |
| 8,573,293 B1 * | 11/2013 | Pruitt .................... | E21B 33/085 166/84.1 |

\* cited by examiner

*Primary Examiner* — Cathleen R Hutchins
(74) *Attorney, Agent, or Firm* — Schrantz Law Firm, PLLC; Stephen D. Schrantz

(57) ABSTRACT

The tall flange rubber adapter attaches to the inner barrel of a rotating head assembly. A rubber attaches to the tall flange rubber adapter. The rubber secured to the rubber adapter also rotates with the inner barrel thus maintaining the seal with the drill string to divert the drilling fluid from the well to the outlet flange. Fasteners install upward into the adapter and the inner barrel to secure the rubber adapter with the inner barrel. The increased height of the rubber adapter provides additional surface for the fastener to contact. The increased contact of the fastener with the tall flange maintains the fastener within the rubber adapter and the inner barrel to limit fasteners from falling downhole into the drilling area.

20 Claims, 11 Drawing Sheets

TALL FLANGE RUBBER ADAPTER

CROSS-REFERENCE TO RELATED APPLICATIONS

This application is a continuation in part of U.S. patent application Ser. No. 15/064,313 filed on Mar. 8, 2016 entitled TALL FLANGE RUBBER ADAPTER.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

Field of the Invention

In well drilling, with a rotary drilling rig, the drill bit and drilling pipe receive rotary motion from power equipment located on the surface. Below the drilling floor, at the ground surface, an assembly known as a rotating head allows the circulation of various fluids used in the drilling. The present invention relates to a tall flange rubber adapter for rotating heads for oil and gas wells and more particularly, to a tall flange rubber adapter that enables the ease of use for the end user and also a more efficient method of assembly and disassembly to decrease down time caused by assembling or disassembling the rotating head and to decrease manufacturing costs. A conventional drilling string is inserted or "stabbed" through the rotating head assembly, including the one or two rubbers rotatably mounted in the rotating head assembly, to seal the drilling string.

Early drilling heads employed a single rubber to divert the flow of drilling fluid away from the rig floor. The rubber was fixedly mounted within the drilling head and the drill string rotated and moved longitudinally through the rubber as the rubber sealed against the string. The action of the drill string caused considerable wear on the rubber requiring frequent replacement. To reduce the abrasive wear, the rubber was rotated with the drill string to maintain sealing contact. However, a drill string typically includes various diameter sections. For example, the drill collars joining sections of drill string have a greater diameter than the drill pipe itself. Thus, the rubber was sized to maintain sealing contact with the drill pipe or the smallest diameter component which traveled through the drilling head. Because of the different diameters of the drill string, the rubber needed to be rigid enough to withstand the pressures of the drilling fluid yet resilient enough to maintain a seal on the drill collars as the drill collars passed through the drilling head and thereafter return to the original configuration to seal against the smaller diameter drill pipe. The operating cycle of the rubber was directly proportional to the number of drill collars which passed through the single rubber since the rubber would not return to its original sealing diameter.

Present day drilling operations are extremely expensive, and an effort to increase the overall efficiency of the drilling operation while minimizing expense requires the essentially continuous operation of the drilling rig. Fasteners from known systems fall downhole. These fasteners damage equipment and reduce the lifetime of the equipment. Such damage requires the user to replace the equipment. Drilling operations must be suspended while users replace the equipment. Thus, it is imperative that downtime be minimized.

To prevent fasteners from falling downhole, the fasteners are often wired into the rotating head assembly. Wiring the fasteners requires time and effort. If a user forgets or chooses not to wire the fastener to the rotating head assembly, the fastener falls downhole.

In this regard, there is a need for improved sealing of the rotating head with the rubbers to maximize the life of the equipment and reduce unnecessary damage. There is also a need to secure the fasteners without requiring each fastener to be individually wired to the rotating head assembly.

Description of the Known Art

Patents and patent applications disclosing relevant information are disclosed below. These patents and patent applications are hereby expressly incorporated by reference in their entirety.

U.S. Pat. No. 4,511,193 (the '193 patent) issued to Geczy on Apr. 16, 1985 teaches a combined radial and thrust bearing assembly for a down-hole drilling assembly to journal a shaft, mounting the drill bit, in a housing. The bearing assembly is used between a down-hole fluid powered motor and a drill bit for drilling oil wells, for example. The bearing assembly includes cooperative pairs of upper and lower inner races located on the shaft for mutual rotation. Each of the inner races includes a pair of interchangeable toroidal tracks. Cooperative pairs of upper and lower outer races are fixed against rotation in the housing. Each outer race has a pair of interchangeable toroidal tracks to selectively cooperate with the tracks of the inner races to define a toroidal channel to receive a number of bearing balls. Spring means are disposed between the upper and lower pairs of outer races and the housing and between the upper and lower pairs of outer races to provide a compliant coupling for the even distribution of radial and upwardly and downwardly directed thrust loads between the races and balls and eventual transfer to the housing. Drilling fluid is circulated through the bearing assembly for cooling and lubrication.

U.S. Pat. No. 5,213,158 ("the '158 patent") issued to Bailey, et al. on May 25, 1993 teaches a drilling head with dual rotating stripper rubbers designed for high pressure drilling operations ensuring sealing under the extreme conditions of high flow or high pressure wells such as horizontal drilling. The dual stripper rubbers taught by the '158 patent seal on the same diameter yet are manufactured of different materials for different sealing functions. The lower stripper rubber is manufactured from a more rigid, abrasive resistant material to divert the flow from the well. The upper stripper rubber is manufactured of a softer sealing material that will closely conform to the outer diameter of the drill string thereby preventing the flow of fluids through the drilling head.

U.S. Pat. No. 5,647,444 issued to Williams on Jul. 15, 1997 discloses a rotating blowout preventor having at least two rotating stripper rubber seals which provide a continuous seal about a drilling string having drilling string components of varying diameter. A stationary bowl is designed to support a blowout preventor bearing assembly and receives a swivel ball that cooperates with the bowl to self-align the blowout preventor bearing assembly and the swivel ball with respect to the fixed bowl. Chilled water is circulated through the seal boxes of the blowout preventor bearing assembly and liquid such as water is pumped into the bearing assembly annulus between the stripper rubbers to offset well pressure on the stripper rubbers.

These shortcomings are overcome by the invention disclosed herein. Accordingly, it would be desirable to provide an improved device and system for maintaining the fasteners secured with the rotating head assembly.

SUMMARY OF THE INVENTION

The tall flange rubber adapter of the present invention attaches to the inner barrel of a rotating head assembly. A rubber attaches to the tall flange rubber adapter. As a result, the rubber also rotates with the inner barrel thus maintaining the seal with the drill string to divert the drilling fluid from the well to the outlet flange.

The rubber adapter provides a tall flange for securing the rubber adapter to the inner barrel. Fasteners install upward into the rubber adapter and the inner barrel. The fasteners secure the rubber adapter to the bottom of the inner barrel. The increased height of the rubber adapter provides additional surface for the fastener to contact. The increased contact of the fastener with the tall flange maintains the fastener within the rubber adapter and the inner barrel.

Stripper fasteners install downwards into the shoulder of the rubber adapter. These stripper fasteners secure the rubber to the rubber adapter. The fasteners install downward to prevent the fasteners from falling downhole.

The rubber has a diameter that seals against the drill string, specifically the smaller diameter drill pipe. The rubber maintains a constant seal of the drill pipe to prevent debris and other contaminants from entering the rotating head assembly.

The present invention reduces the downtime of the drilling rig by reducing time expended replacing the rubbers. Known rotating heads require a user to individually remove each rubber after halting operation of the drilling rig. Thus, known rotating heads increased downtime of the drilling and reduced the operating time of the drilling rig to increase expenses of the drilling operation.

The present invention eliminates possible damage from fasteners that loosen during the drilling operation. The known art allowed exposed fasteners to loosen during operation of the drilling rig. The loosened fasteners then drop into the drilling hole. Because the drilling rig would continue to operate with the fastener in the drilling hole, the drilling bit wears at a faster rate because of the grinding of the fastener. The present invention increases the contact between the fasteners and the rubber adapter and inner barrel. The increase contact of the fasteners with the present invention reduces the likelihood of the fasteners falling downhole.

Other objects, features, and advantages of the invention will be apparent from the following detailed description taken in connection with the accompanying drawings.

It is an object of the present invention to provide an improved rotating head that enables ease of use for the end user.

Another object of the present invention is to allow more efficient assembly and disassembly of the rotating head assembly.

Another object of the present invention is to increase efficiency of the assembly and disassembly of the rotating head assembly to decrease the amount of down time due to necessary repairs of the rotating head assembly.

Another object of the present invention is to increase the life of bearings, seals, and other internal components by preventing debris from entering the bearings, seals, and other internal components.

Another object of the present invention is to allow for the trouble free operation of the rotating head assembly for the rig personnel.

Another object of the present invention is to create a safer work environment for rig personnel.

Another object of the present invention is to simplify the method of assembly of the rotating head assembly.

Another object of the present invention is to prevent unnecessary wear and damage to the drill string.

Another object of the present invention is to reduce the number of fasteners from falling downhole.

In addition to the features and advantages of the rubber adapter according to the present invention, further advantages thereof will be apparent from the following description in conjunction with the appended drawings.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 7 is also a right side view, the left side view being a mirror image of the right side view.

DETAILED DESCRIPTION

Figure 1:
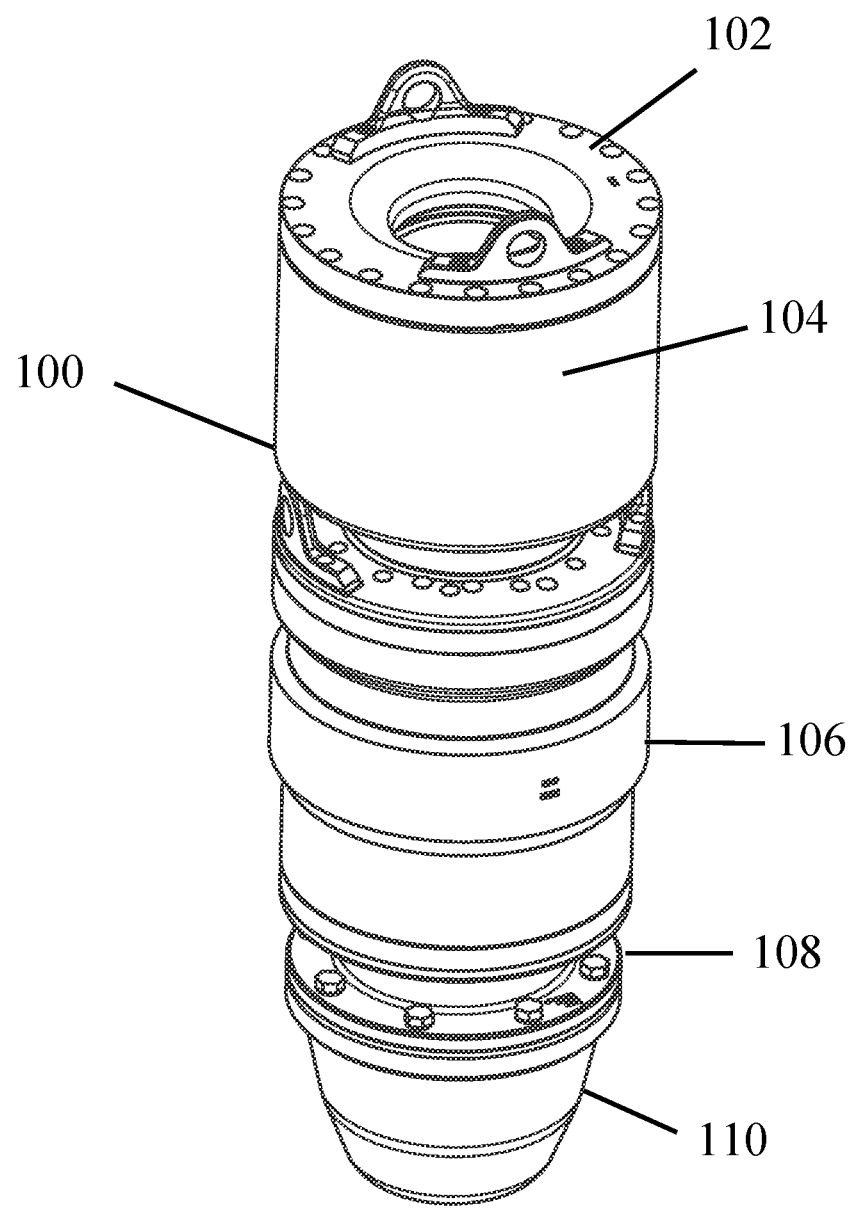
FIG. 1 is an environmental view showing one embodiment of the present invention.
Figure 2:
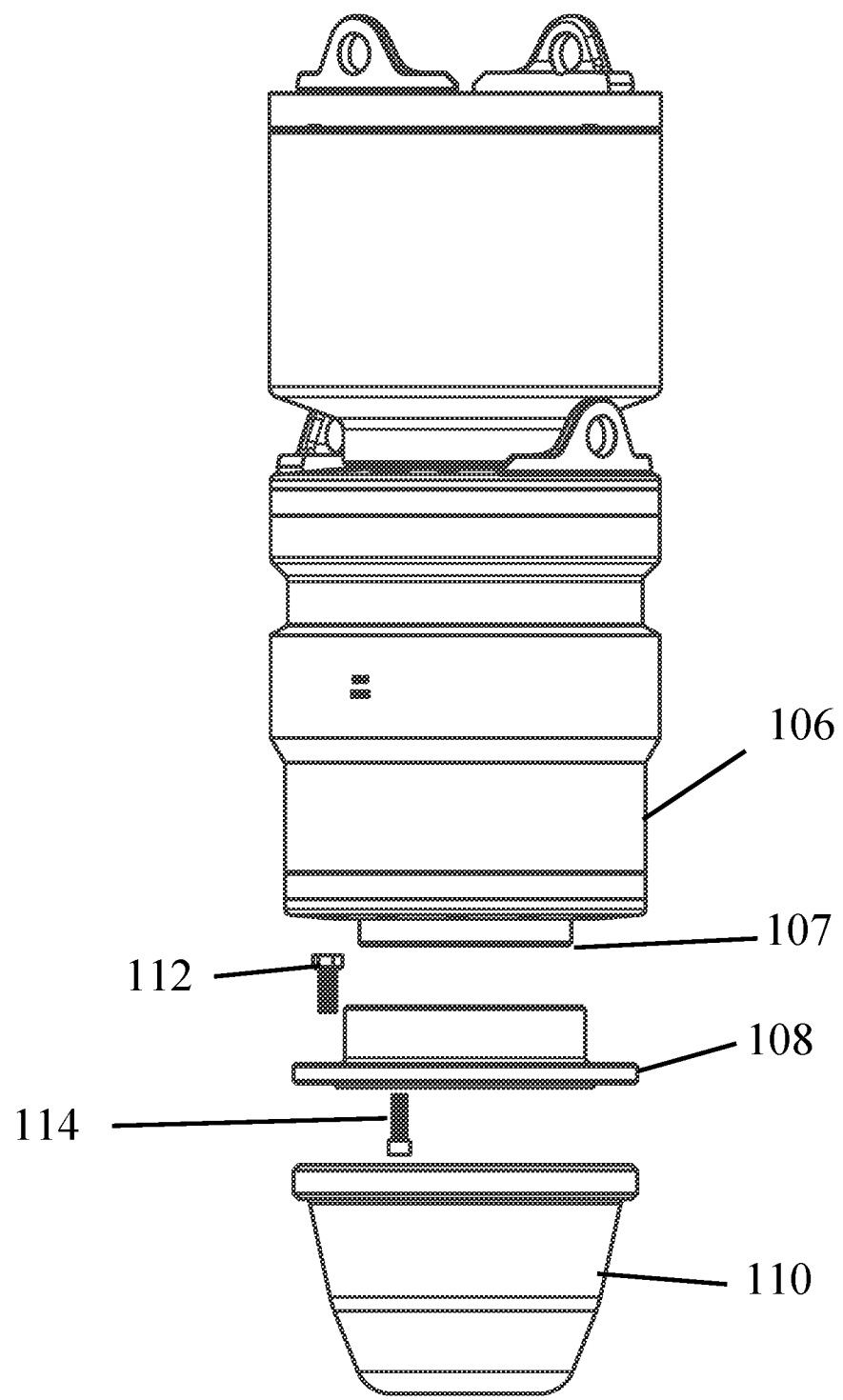
FIG. 2 is a partially exploded view thereof.

Referring to FIGS. 1 and 2, the rotating head assembly of the present invention is generally illustrated by reference numeral 100. The rotating head assembly 100 is characterized by an attachment body 102 for securing a rubber within housing 104, such as a top pot, an inner barrel 107, a rubber adapter 108, and a rubber 110. The inner barrel 107, rubber adapter 108, and rubber 110 rotate with the drilling string.

Outer barrel 106 remains stationary as outer barrel 106 is secured within the bowl (not pictured).

The drilling string inserts vertically into the bore through attachment body 102, the rubber within housing 104, housing 104, inner barrel 107, rubber adapter 108, and rubber 110. The rubber adapter 108 secures the rubber 110 to the inner barrel 107. The attachment of the rubber adapter 108 with the inner barrel is sealed with a seal, such as an O-ring. The rubber 110 rotates with the inner barrel 107 due to the attachment of the rubber adapter 108 with the inner barrel 107.

Continuing to refer to FIG. 2, the inner barrel 107 rotates while outer barrel 106 remains stationary. A portion of the inner barrel 107 extends vertically below the outer barrel 106 for securing the rubber adapter 108. Fastener 112 inserts vertically downwards through rubber adapter 108 into rubber 110 to secure the rubber 110 to rubber adapter 108. Fastener 114 inserts vertically upwards through rubber adapter 108 into inner barrel 107.

Figure 3:
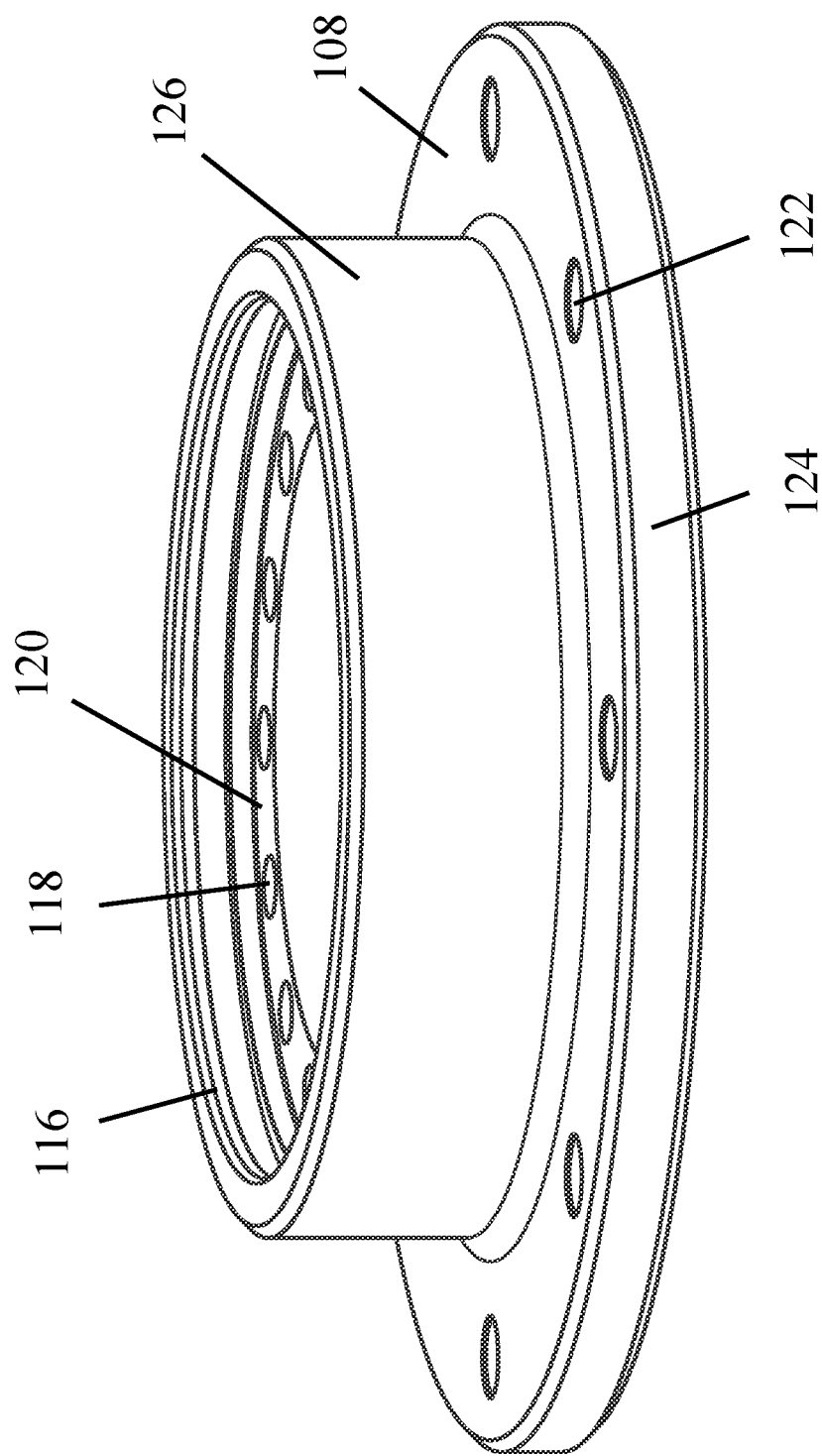
FIG. 3 is a perspective view of a rubber adapter of one embodiment of the present invention.
Figure 4:
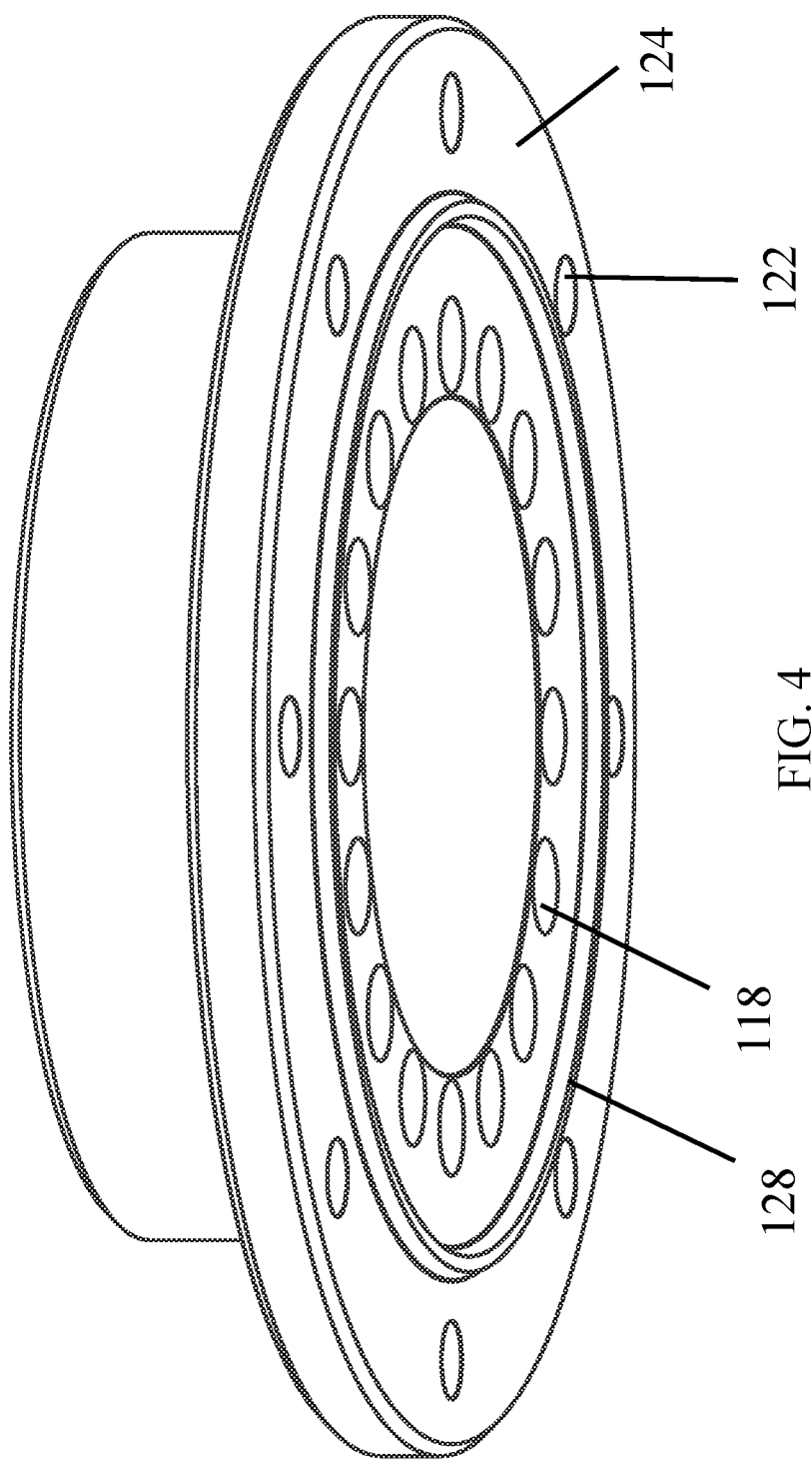
FIG. 4 is a perspective view thereof.

FIGS. 3-4 show the rubber adapter 108. Outer fastener apertures 122 enable fasteners, such as bolts, threaded fasteners, to insert vertically downward into the rubber. Adapter shoulder 124 prevents the fastener 112 from falling downhole.

Adapter head 126 extends vertically above adapter shoulder 124. Adapter shoulder 124 extends radially outward from adapter head 126. Both adapter shoulder 124 and adapter head 126 extend radially outward from a central aperture extending through the rubber adapter 108. The central aperture defines a bore extending along a vertical axis. The drilling string travels downwards into the bore through the inner barrel 107, the rubber adapter 108 and the rubber 110.

Fasteners 114 insert upwards into inner fastener apertures 118 that extend through adapter head 126 until reaching adapter lip 120. Adapter lip 120 is located vertically below the top of the adapter head 126.

Seal groove 116 provides an area for placement of a seal, such as an O-ring. The seal fits into seal groove 116 to seal between the rubber adapter 108 and the inner barrel 107.

Figure 5:
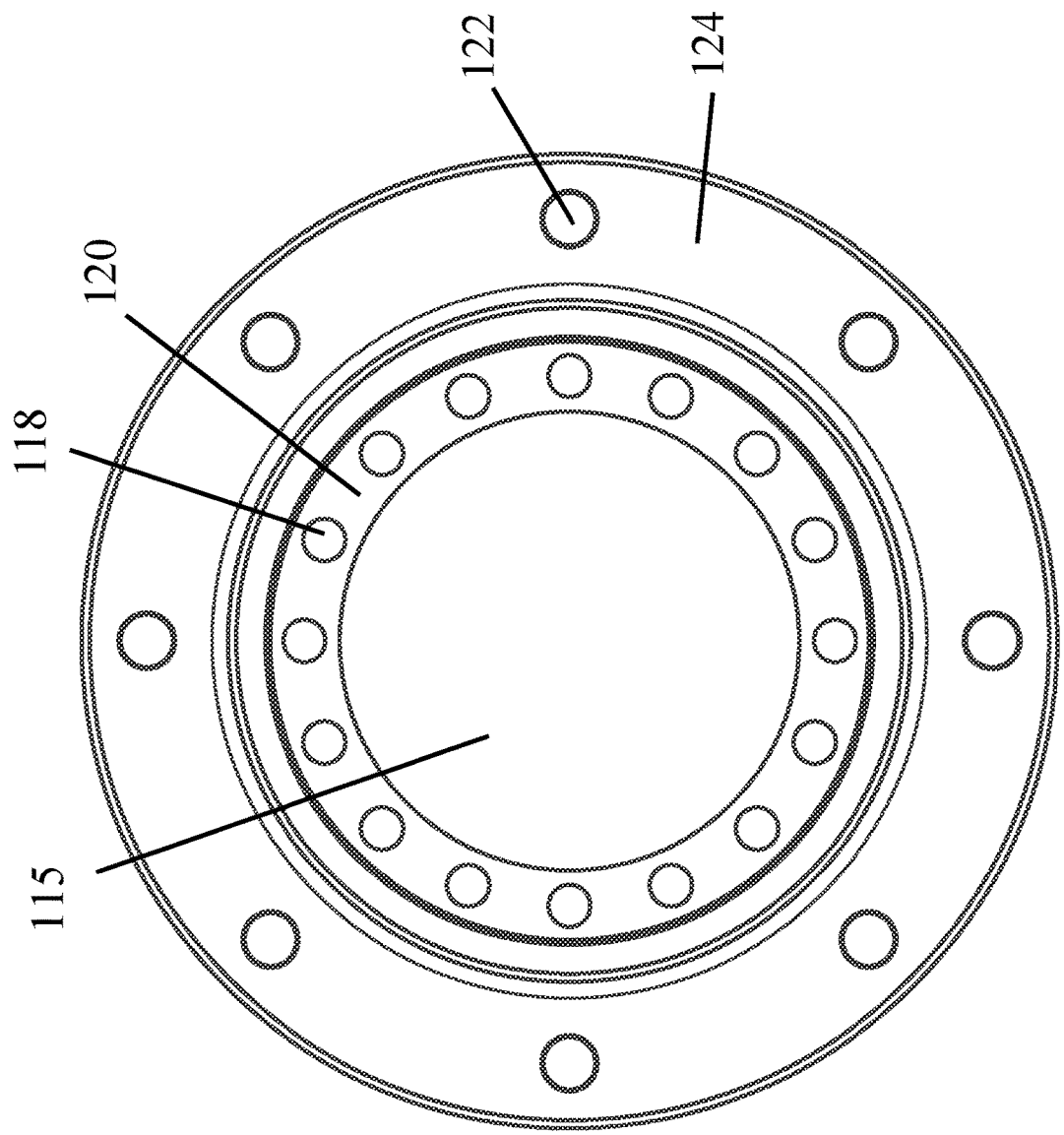
FIG. 5 is a top view thereof.
Figure 6:
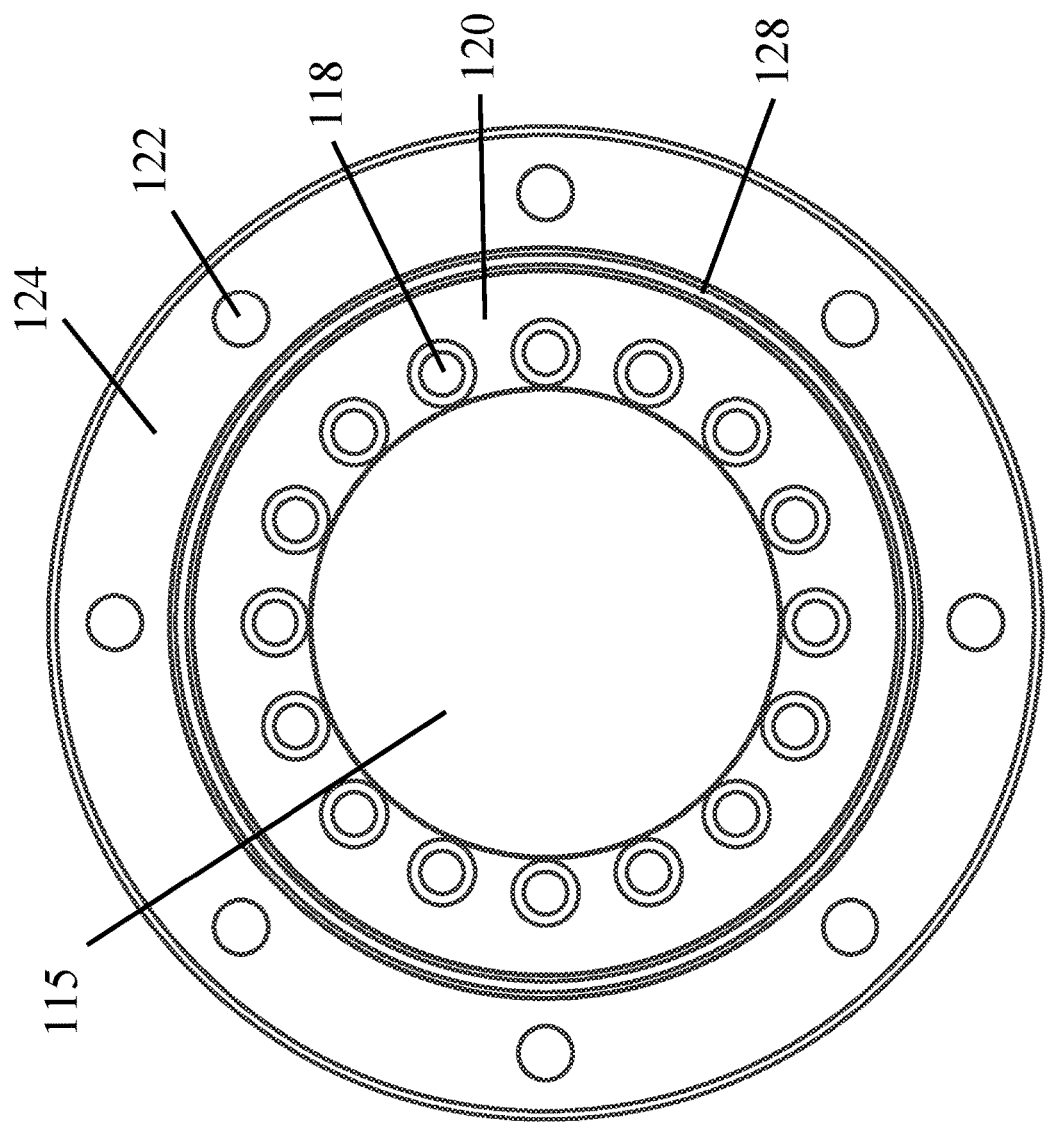
FIG. 6 is a bottom view thereof.

FIGS. 5 and 6 show the central aperture 115 leading into the bore. The central aperture 115 defines a vertical axis. The adapter lip 120 extends radially inward from the adapter head 126. Adapter head 126 extends radially outward from central aperture 115. Adapter shoulder 124 extends radially outward from adapter head 126.

Figure 7:
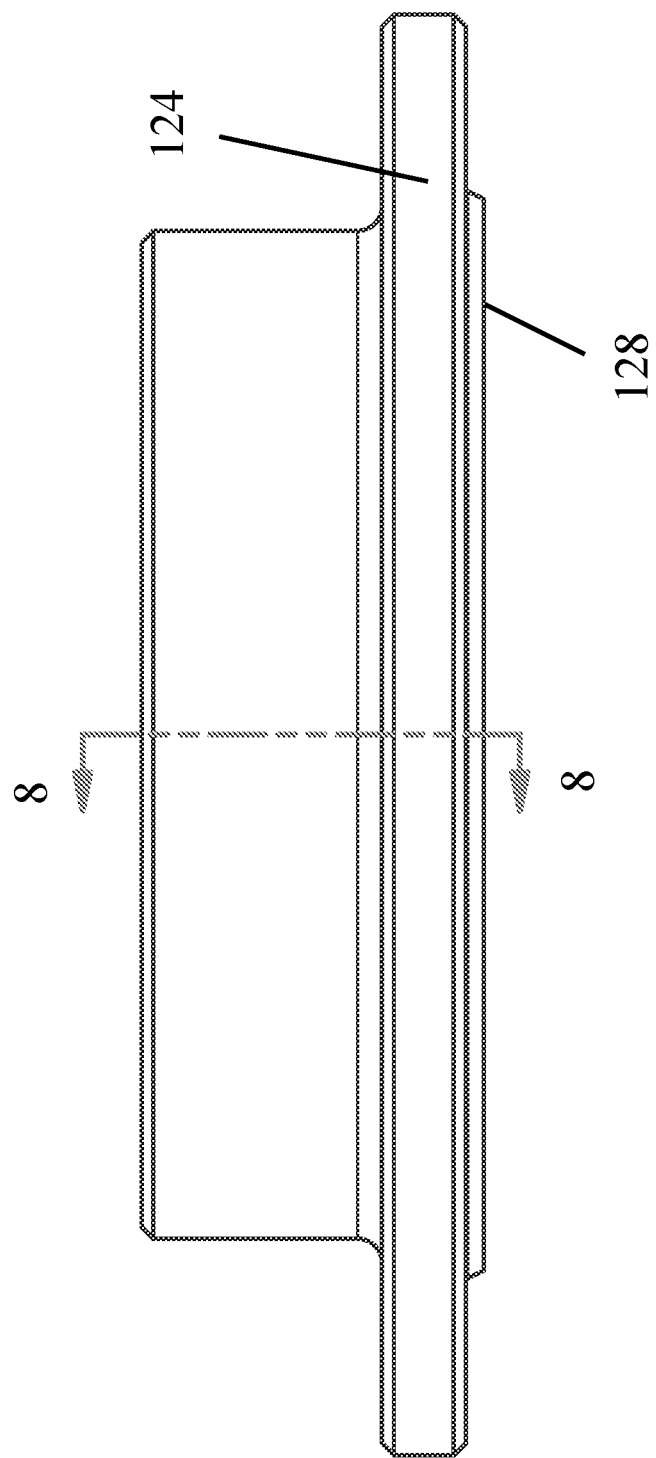
FIG. 7 is a front view thereof, the rear view being a mirror image of the front view.

To seal the attachment of the rubber 110 with rubber adapter 108, sealing lip 128 located on the bottom of the attachment body 108 contacts the rubber 110. Fasteners 112 align rubber 110 on rubber adapter 108 such that sealing lip 128 of rubber adapter 108 aligns with sealing lip of rubber 110. The alignment of sealing lip 128 of rubber adapter 108 and sealing lip of rubber 110 seals the rubber 110 on rubber adapter 108. The sealing lip 128 extends vertically below the adapter shoulder 124 to contact the rubber 110 as shown in FIG. 7.

Figure 8:
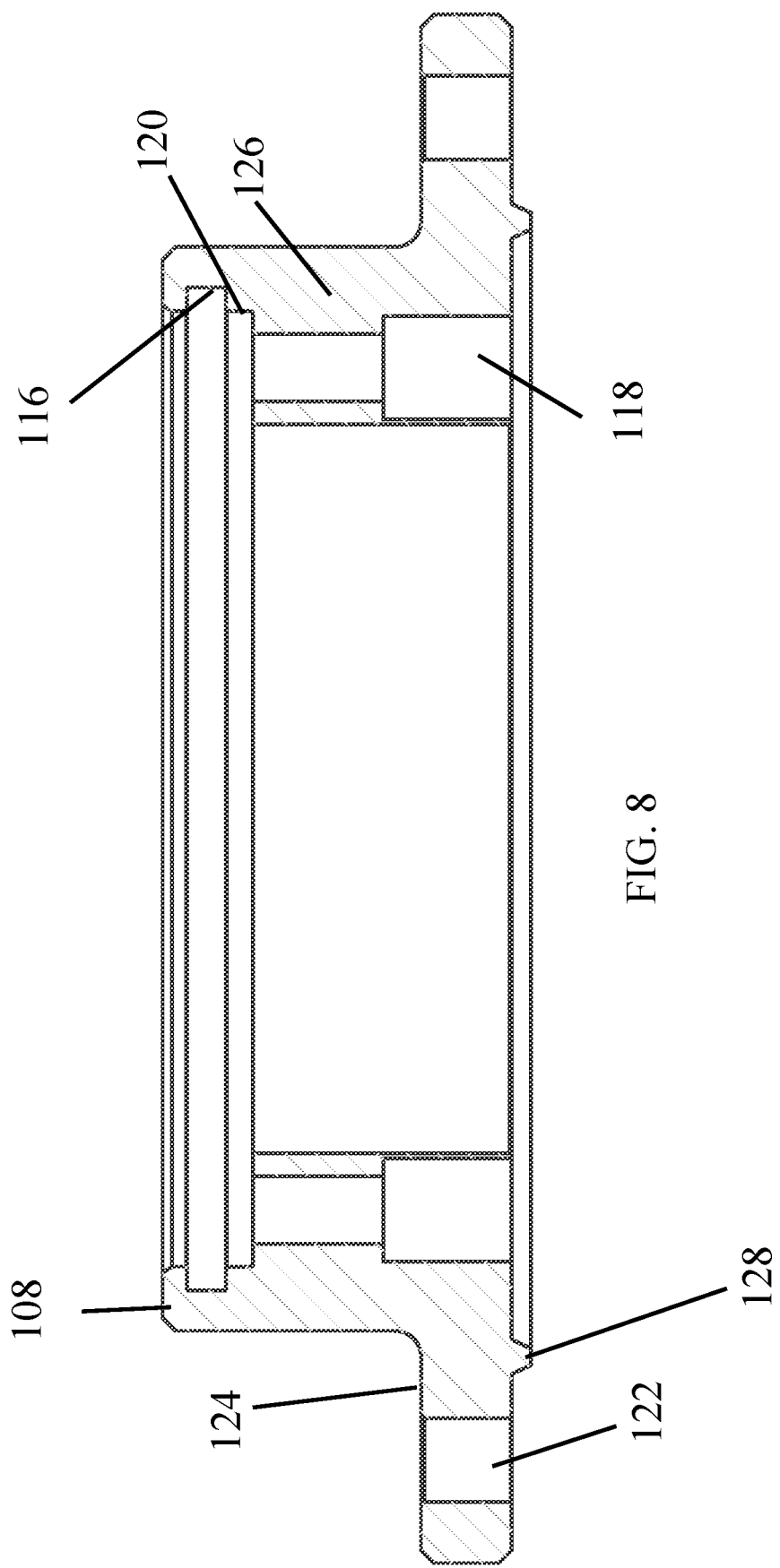
FIG. 8 is a sectional view thereof.

FIG. 8 shows a cross section of the rubber adapter 108. Outer fastener apertures 122 pass completely through the adapter shoulder 124. Sealing lip 128 is located radially inwards from outer fastener apertures 122. Sealing lip 128 located radially inward from outer fastener apertures 122 seals the rubber 100 against the rubber adapter 108 interior of the attachment of rubber 110 with rubber adapter 108.

Inner fastener apertures 118 passes vertically through the rubber adapter 108. The head of fastener 114 of one embodiment does not pass completely through the rubber adapter 108. The inner barrel 107 contacts adapter lip 120. A seal located at seal groove 116 seals between the rubber adapter 108 and the inner barrel 107.

Figure 9:
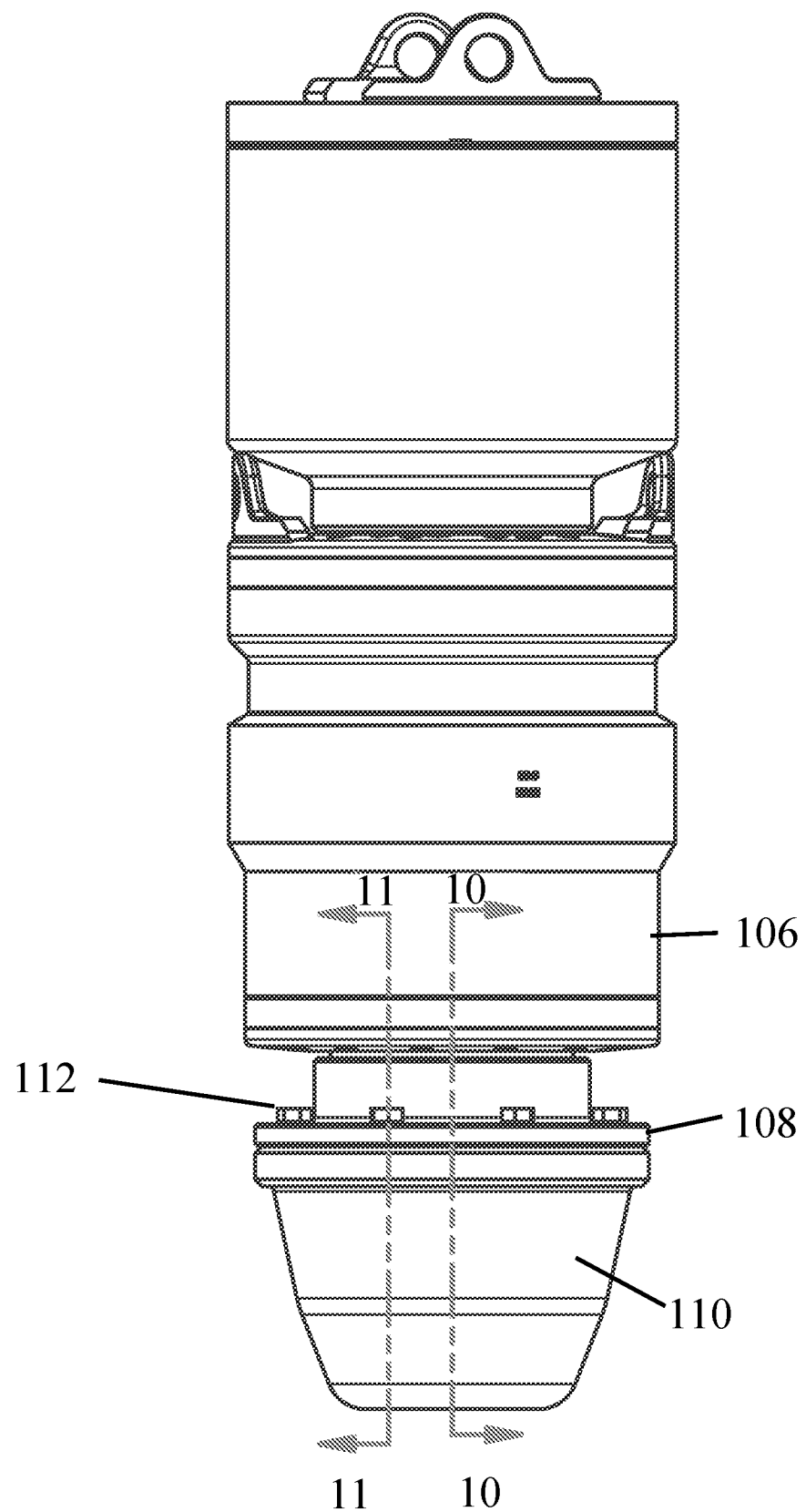
FIG. 9 is an environmental view thereof.

FIG. 9 shows fasteners 112 securing the rubber 110 to rubber adapter 108. Rubber adapter 108 secures to inner barrel which is located within the outer barrel 106. As stated above, the outer barrel 106 remains stationary as the outer barrel 106 is secured within the bowl. Inner barrel 107 rotates with the drilling string and the rubber 110.

Figure 10:
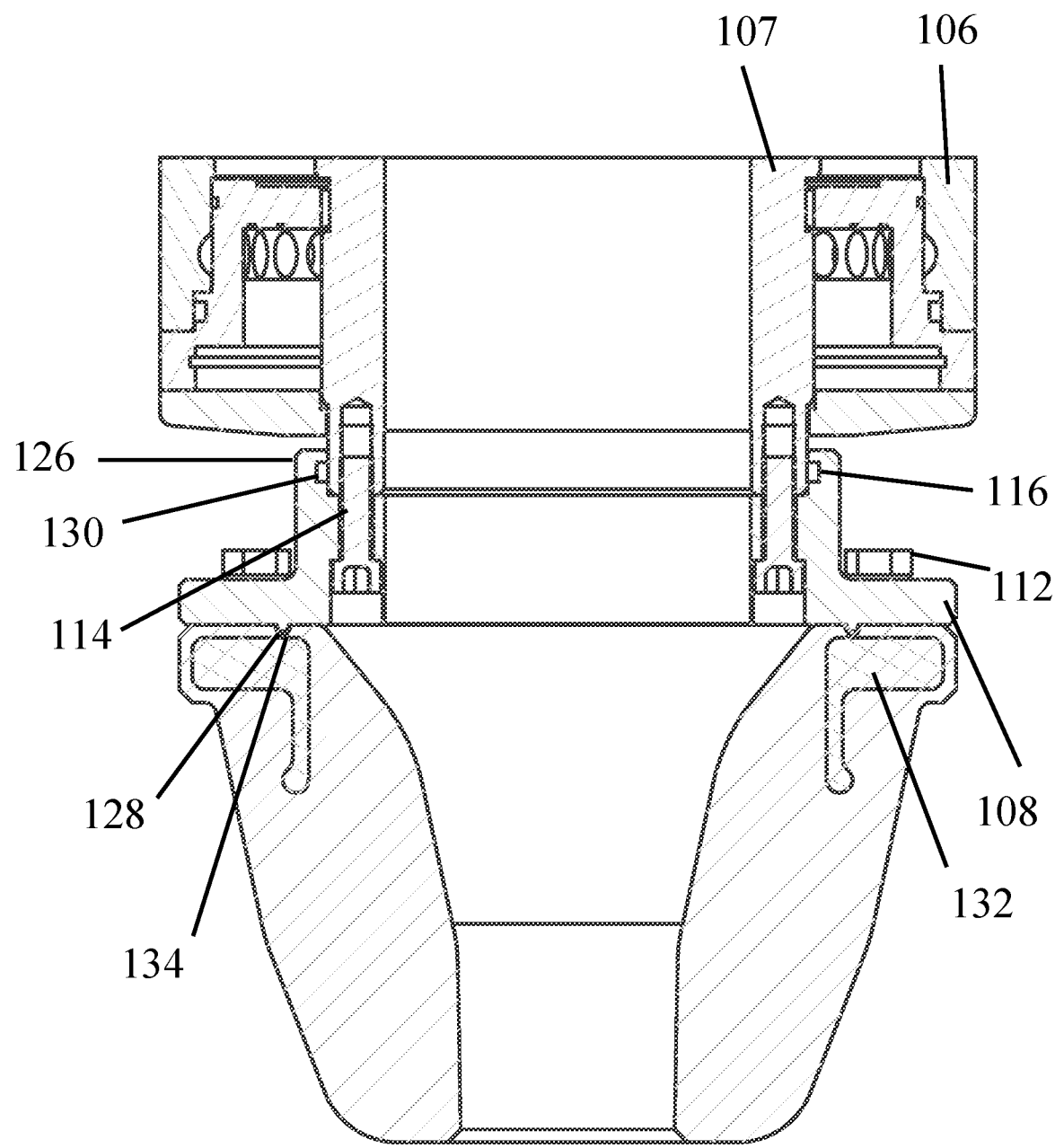
FIG. 10 is a sectional view thereof.
Figure 11:
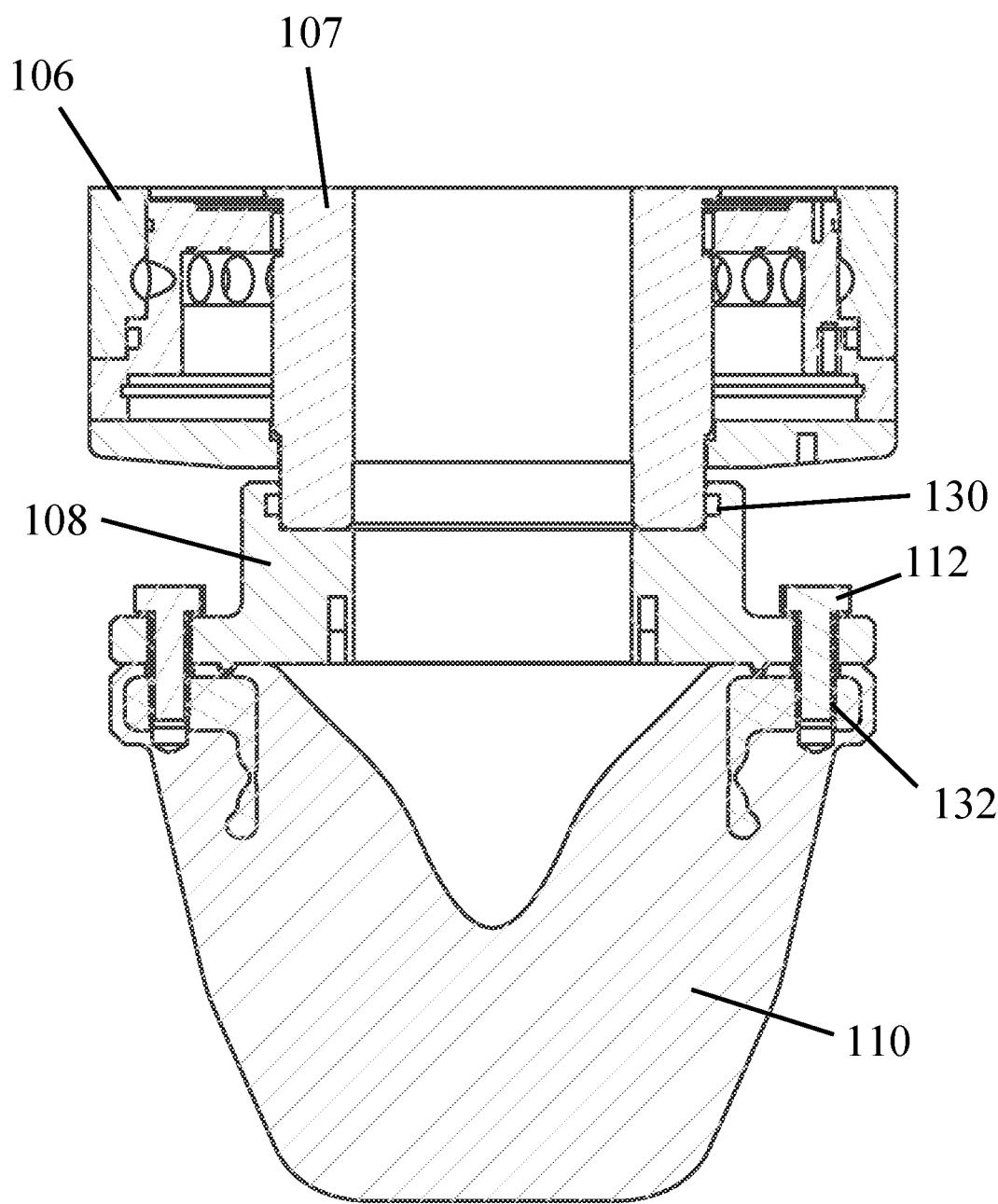
FIG. 11 is a sectional view thereof.

FIGS. 10 and 11 show sectional views of the rubber adapter 108 secured to the inner barrel 107 and the rubber 110 secured to the rubber adapter 108. Referring to FIG. 10, fasteners 114 insert vertically upwards into the rubber adapter 108. The fastener 114 passes into the inner barrel 107. Securing the rubber adapter 108 to the inner barrel 107 ensures the rotation of the rubber adapter 108 with the inner barrel 107. The inner barrel 107 rotates within outer barrel 106.

The adapter head 126 increases the height of the rubber adapter 108 by 1 to 3 inches, preferable 1⅜ inches or 1 and ¼ inches. The increased height of adapter head 126 provides more contact surface area for fastener 114. The increased contact of fastener 114 with rubber adapter 108 and inner barrel 107 reduces the likelihood of fastener 114 loosening and falling downhole. Thus, the adapter head 126 limits the number fasteners that fall downhole into the drilling area. The rubber adapter 108 secures the fasteners 114 such that fasteners 114 will not interfere with the operation of the rotating head assembly. Thus, the increased height of the adapter head 126 reduces damage and deterioration of the drill string. The increased height of adapter head 126 also extends the lifespan of the components of the present invention by preventing unnecessary wear of the components.

FIGS. 10 and 11 also show the seal 130, such as an O-ring. O-ring placed within seal cavity 116 seals the rubber adapter 108 with the inner barrel 107. Sealing lip 128 seals against a sealing lip 134 of rubber 110. Seal 130 seals the rotating head assembly to prevent debris and other contaminants from entering the drilling head assembly.

FIG. 11 shows fastener 112 inserted vertically downwards into outer fastener apertures 122 for securing the rubber 110 with rubber adapter 108. Fastener 112 inserts vertically downward into rubber 110. Rubber 110 provides a cast rubber insert 132 for a more rigid structure and for fastener 112 securing the rubber 110 to the rubber adapter 108. Rubber 110 is constructed of a flexible rubber that seals the drill string to prevent debris and other contaminants from entering the rotating head assembly. To prevent damage to the drill string, rubber 110 tapers to seal against a drilling string punched through the rubber 110. Rubber 110 prevents contaminants and other debris from interfering with the operation of the drilling string and the rotating head assembly.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An apparatus for securing a rubber to an inner barrel of a rotating drilling assembly, a drilling string passing through the rotating drilling assembly along a vertical axis, the apparatus comprising:
a rubber adapter that attaches to the inner barrel to secure the rubber with the inner barrel, the rubber adapter having an outer edge;
a central aperture of the rubber adapter allowing passage of the drilling string vertically through the rubber adapter;
an outer fastener aperture located interior of the outer edge of the rubber adapter, the outer fastener aperture vertically accepting at least one fastener through the rubber adapter;
an outer fastener inserted downward into the outer fastener aperture, the outer fastener passing vertically downward into and through the outer fastener aperture into the rubber to secure the rubber to the rubber adapter; and
an inner fastener aperture located interior of the outer fastener aperture wherein the inner fastener aperture accepts an inner fastener through the rubber adapter to secure the rubber adapter to the inner barrel.

2. The apparatus of claim 1 wherein the inner fastener aperture forms vertically above the outer fastener aperture, the inner fastener inserted upward into the inner fastener aperture, the inner fastener inserted vertically upward into and through the inner fastener aperture to secure the rubber adapter to the inner barrel.

3. The apparatus of claim 2 wherein the height of the inner aperture is greater than the height of the outer fastener aperture.

4. The apparatus of claim 1 further comprising:
an adapter shoulder on which the outer aperture is located;
an adapter head extending vertically above the adapter shoulder wherein the adapter head is located radially inward from the adapter shoulder, the adapter head located radially outward from the central aperture.

5. The apparatus of claim 4 further comprising:
an adapter lip extending radially inward from the adapter head.

6. The apparatus of claim 5 wherein the adapter lip is located vertically above the adapter shoulder.

7. The apparatus of claim 5 wherein the top of the adapter head extends vertically above the adapter lip.

8. The apparatus of claim 5 further comprising:
a seal groove located radially inward from the adapter head, the seal groove accepting a seal for sealing between the rubber adapter and the inner barrel.

9. The apparatus of claim 8 wherein the seal groove is located vertically between the top of the adapter head and the adapter lip.

10. An apparatus for securing a rubber to an inner barrel of a rotating drilling assembly, a drilling string passing through the rotating drilling assembly along a vertical axis, the apparatus comprising:
a rubber adapter that attaches to the inner barrel to secure the rubber with the inner barrel, the rubber adapter having a bottom surface;
a central aperture of the rubber adapter allowing passage of the drilling string vertically through the rubber adapter;
an adapter lip located radially outward from the central aperture;
an adapter head located radially outward from the adapter lip wherein the adapter head extends vertically above the adapter lip;
an adapter shoulder located radially outward from the adapter head wherein the adapter head extends vertically above the adapter shoulder;
an outer fastener aperture located on the adapter shoulder;
an outer fastener inserted downward into the outer fastener aperture, the outer fastener passing vertically downward into and through the outer fastener aperture into the rubber to secure the rubber to the rubber adapter below the adapter shoulder; and
an inner fastener aperture located on the adapter lip.

11. The apparatus of claim 10 wherein the outer fastener aperture passes vertically through the adapter shoulder to secure the rubber to the rubber adapter at the outer fastener aperture.

12. The apparatus of claim 10 wherein the inner fastener aperture passes vertically through the rubber adapter to secure the rubber adapter to the inner barrel at the inner fastener aperture, the inner fastener inserted upward into the inner fastener aperture, the inner fastener inserted vertically upward into and through the inner fastener aperture to secure the rubber adapter to the inner barrel.

13. The apparatus of claim 10 further comprising:
a sealing lip on the bottom surface of the rubber adapter wherein the sealing lip extends vertically downward from the bottom surface of the adapter shoulder.

14. The apparatus of claim 13 wherein the sealing lip is located radially inward from the outer fastener aperture.

15. The apparatus of claim 13 wherein the sealing lip is located between the inner fastener aperture and the outer fastener aperture.

16. The apparatus of claim 10 further comprising:
a seal groove located radially inward from the adapter head, the seal groove accepting a seal for sealing between the rubber adapter and the inner barrel.

17. The apparatus of claim 16 wherein the seal groove is located vertically between the top of the adapter head and the adapter lip.

18. An apparatus for securing a rubber to an inner barrel of a rotating drilling assembly, the drilling string passing through the rotating drilling assembly along a vertical axis, the apparatus comprising:
a rubber adapter that attaches to the inner barrel to secure the rubber with the inner barrel, the rubber adapter having a bottom surface;
a central aperture of the rubber adapter allowing passage of the drilling string vertically through the rubber adapter;
an adapter lip located radially outward from the central aperture;
an adapter head located radially outward from the adapter lip wherein the adapter head extends vertically above the adapter lip;
an adapter shoulder located radially outward from the adapter head wherein the adapter head extends vertically above the adapter shoulder;
an outer fastener aperture located on the adapter shoulder;
an outer fastener inserted downward into the outer fastener aperture, the outer fastener passing vertically downward into and through the outer fastener aperture into the rubber to secure the rubber to the rubber adapter;
an inner fastener aperture located on the adapter lip; and
an inner fastener that inserts upward into the inner fastener aperture, wherein the inner fastener passes vertically upward into and through the inner fastener aperture into the inner barrel to secure the rubber adapter to the inner barrel.

19. The apparatus of claim 18 further comprising:

a sealing lip on the bottom surface of the rubber adapter wherein the sealing lip extends vertically downward from the bottom surface of the adapter shoulder wherein the sealing lip is located between the inner fastener aperture and the outer fastener aperture.

20. The apparatus of claim 18 further comprising:

a seal groove located radially inward from the adapter head, the seal groove accepting a seal for sealing between the rubber adapter and the inner barrel wherein the seal groove is located vertically above the adapter lip.

* * * * *